United States Patent [19]

Kobayashi et al.

[11] 3,975,764
[45] Aug. 17, 1976

[54] TELEVISION SIGNAL RECORDING AND REPRODUCING SYSTEM

[75] Inventors: Fukashi Kobayashi; Hiroshi Taniguchi, both of Hirakata; Kenji Kanai, Neyagawa, all of Japan

[73] Assignee: Matsushita Electric Industrial Co., Ltd., Osaka, Japan

[22] Filed: Oct. 7, 1974

[21] Appl. No.: 512,953

[30] Foreign Application Priority Data

| Oct. 12, 1973 | Japan | 48-115224 |
|---|---|---|
| Oct. 12, 1973 | Japan | 48-115225 |
| Oct. 12, 1973 | Japan | 48-115226 |
| Nov. 28, 1973 | Japan | 48-134752 |
| Nov. 28, 1973 | Japan | 48-134753 |
| Nov. 28, 1973 | Japan | 48-134754 |
| Nov. 28, 1973 | Japan | 48-134755 |
| Nov. 28, 1973 | Japan | 48-134756 |
| Dec. 19, 1973 | Japan | 48-143159 |

[52] U.S. Cl. ................................ 360/23; 360/33
[51] Int. Cl.² ............................................ H04N 5/79
[58] Field of Search ............ 360/23, 33, 37; 358/4, 358/8

[56] References Cited
UNITED STATES PATENTS

| 2,694,748 | 11/1954 | Johnson | 360/33 |
|---|---|---|---|
| 2,794,066 | 5/1957 | Mullin | 360/23 |
| 2,818,464 | 12/1957 | Sziklai | 360/23 |
| 2,845,484 | 7/1958 | Johnson | 360/33 |
| 2,867,685 | 1/1959 | Johnson | 360/37 |
| 2,907,819 | 10/1959 | Perilhou | 360/33 |
| 3,553,080 | 1/1971 | Hammond | 360/23 |

*Primary Examiner*—Howard W. Britton
*Attorney, Agent, or Firm*—Stevens, Davis, Miller & Mosher

[57] ABSTRACT

A television signal recording and reproducing system wherein a television signal to be recorded is sequentially sampled at a predetermined number of points during each horizontal scanning period thereby to convert the television signal occupying a wide band into substantially vertically scanned signals. The converted signals, which have also been divided into multichannel signals, are recorded on a recording medium with a multichannel magnetic head. Reproduced signals from the multichannel head are sampled and added to produce the original television signals in a similar but reverse operation to the recording operation.

6 Claims, 16 Drawing Figures

TELEVISION SIGNAL RECORDING AND REPRODUCING SYSTEM

The present invention relates to a television signal recording and reproducing system, and more particularly it relates to a television signal recording and reproducing system of the type which employs a multichannel magnetic head.

Among the known systems for recording and reproducing television signal, video tape recorders which records a signal on a magnetic tape and reproduces the recorded signal have become generally known. All of the known video tape recorders which have come into practical use are of the type which employs rotary magnetic heads, although there are special-purpose video tape recorders known in the art which have come into use and which employ a stationary head.

While the simple rotary head video tape recorders have come into fairly wide use, these video tape recorders are disadvantageous in that their wide use has been considerably impeded by their high manufacturing costs due to the facts that the video heads are rotated at high speed, that an exceedingly high degree of mechanical accuracy is required for the tape transport mechanism, that the effects of jitters in the recording and reproduction of signal must be eliminated (particularly in the recording and reproduction of color signals), that a complicated tape transport control circuit is required, and so on.

On the other hand, while many different types of fixed head video tape recorders have been proposed, to date none of these devices has come into practical use for the following reasons. In recording and reproducing video signals with the fixed head, it is necessary to record and reproduce the video signal in a wide bandwidth ranging from direct current to several MHz, and means which have heretofore been proposed to accomplish this includes a method in which the tape is moved at high speed (on the order of 3 m/sec), and another method in which a video signal is recorded with a stationary multichannel magnetic head on the basis of time division recording or frequency division recording. With the former method in which the tape is moved fast, while the video signal can be recorded and reproduced with a single-channel stationary head, no system of this type has ever come into practical use since, due to the very high tape speed, it is difficult to ensure the desired stability of the tape transportation, the one-way travel time of the tape is several minutes with the result that the direction of movement of the tape must be reversed repeatedly and this gives rise to the problem of a blanking in the picture during every reversing operation, the high tape speed gives rise to jitters of considerable magnitude in recording and reproducing the video signal, it is impossible to obtain a satisfactorily wide frequency band for the recording and reproduction of the video signal even with a tape speed as fast as about 3 m/sec, it is not easy to operate the system and so on. On the other hand, while a variety of systems have been proposed in which the video signal is recorded with a multichannel stationary head on the basis of a time division recording method (e.g. U.S. Pat. No. 2,952,745 and Japanese Pat. No. 10,705/59), none of these systems has ever come into practical use due to the fact that the tape speed for video signal recording must be faster than 1 m/sec, and therefore there are deficiencies in respect of the stability, the picture quality, the recording density and the manufacturing cost of the system. Further, the systems of the type which records video signals with a multichannel head on the basis of the frequency division recording method, such as, shown in U.S. Pat. No. 2,836,651 and U.S. Pat. No. 3,412,218, also have a number of disadvantages such as the phase distortion due to the frequency division and the distortion between the channels.

Although, as mentioned above, many different types of fixed head video tape recorders have heretofore been proposed, none of these systems has ever reached the stage of commercial manufacture.

It is therefore an object of the present invention to provide a system for recording and reproducing television signals with a multichannel magnetic head at low tape speed.

The above and other objects, features and advantages of the present invention will become readily apparent from considering the following detailed description taken in conjunction with the accompanying drawings, in which.

The present invention will now be described in greater detail with reference to the accompanying drawings.

With the known television signal recording and reproducing systems, a problem occurs with respect to the wide video signal transmission bandwidth needed due to the scanning standard for producing a television signal. In the case of an NTSC-type television signal, for example, 30 frames are transmitted every second and each frame is divided into two fields. Each of the fields comprises 262.5 horizontal scanning lines and therefore one frame comprises 525 horizontal scanning lines. The horizontal scanning lines in the even field scan between the horizontal scanning lines in the odd field according to the interlacing procedure. The horizontal scanning frequency $f_H$ is 15.75 kHz. With this scanning standard, the resolution of about 80 lines per 1 MHz transmission band is obtained. It will therefore be seen that a transmission band of about 3 MHz is necessary to obtain the required resolution of 250 lines.

According to the present invention, the television signal having such a wide bandwidth is essentially converted into vertically scanned signals and thus divided into multichannel signals to reduce the signal transmission band for each channel to about 15 kHz for recording on the recording medium. In other words, by using a multichannel head which has been made possible by the recent technical progress (the manufacture of multichannel heads comprising more than 100 channels has been facilitated by the evaporation deposited head techniques), it is now possible to record television signals at very low tape speeds of 20 to 30 cm/sec.

Figure 1:
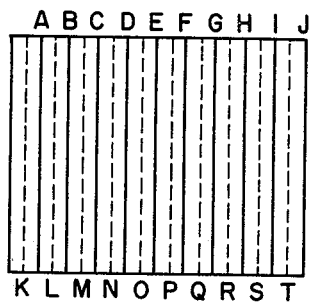
FIG. 1 is a diagram for explaining the vertical scanning method used with the present invention.

Referring now to FIG. 1 showing a diagram for explaining the vertical scanning method for facilitating the understanding of the invention, symbols A, B, C, . . ., J and symbols K, L, M . . ., T designate vertical scanning lines and, instead of being traced sequentially in the sequential order of A → B → C → ... → J, the scanning lines, A, B, . . ., J are traced simultaneously, and the scanning lines K, L, M, . . ., T are also traced simultaneously following the completion of the tracing of the lines A, B, . . . J. The repetition frequency of the scanning lines A through J and K through T is selected to be 60 Hz. To accomplish such a scanning, it is necessary to use the same number of devices as the scanning lines, and therefore the required scanning cannot be readily accomplished by using any known type of television camera tube. Consequently, it is necessary to prepare a television camera tube comprising a plurality of electron guns or alternately a specially designed apparatus capable of parallel and simultaneous scanning must be employed. For example, a scanning method may be conceived which employs a combination of a multichannel optical beam utilizing for example a laser beam and integrated semiconductor sensors.

Figure 2:
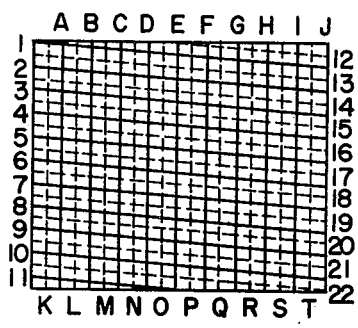
FIG. 2 is a diagram useful in explaining the manner in which a television signal is converted into scanned video signals used with a recording and reproducing system according to the present invention.
Figure 3:
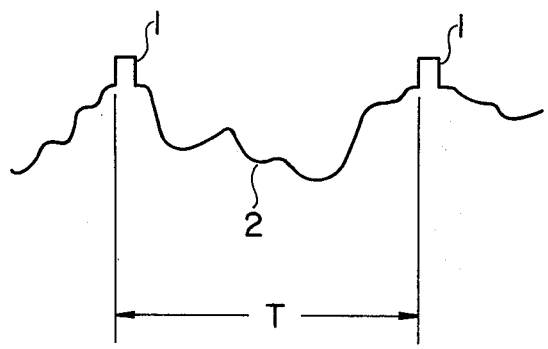
FIG. 3 is a diagram showing the waveform produced by the vertical scanning method of this invention.

Practically, however, the required scanned signals may be obtained from the conventional television signal without necessarily resorting to the abovementioned devices which are capable of multichannel simultaneous parallel scanning. In other words, as shown in FIG. 2, the signals at those points corresponding to the intersections between a horizontal scanning line 1 of the standard television signal and the vertical scanning lines A, B, . . ., J are sampled and the respective sampled values are sent to a hold circuit which holds the signals for the duration of one horizontal scanning period and then sends them to an $m$-channel transmission system ($m = 10$ in the illustrated embodiment). Then, the signals at the intersections between a horizontal scanning line 2 and the vertical scanning lines A, B, . . ., J are sampled and the resulting signals are sent to the $m$-channel transmission system after they have been held for the duration of one horizontal scanning period. This process is successively repeated so that a signal as shown in FIG. 3 is produced for each of the $m$-channels at the end of one field. In FIG. 3, T is the repetition period of the signal and this corresponds to 1/60 of a second in the case of the NTSC signal. Numeral 1 designates vertical synchronizing signals, and numeral 2 designates a vertically scanned signal. For the next field, the interlaced scanning is also effected in the vertical direction. And thus the intersections between the vertical lines K, L, . . ., T and each of horizontal scanning lines 12, 13, . . . . ., 22 are sampled successively so that the resulting signals are held for the duration of one horizontal scanning period and they are then sent to the transmission system.

With the operation described above, the standard television signal is converted into the vertically simultaneously scanned $m$ channel signals. While, for the case shown in FIG. 2, the number of the transmission lines is 10, there is a linear relationship between the number of the channels and the horizontal resolution, and therefore if $m = 150$, then the horizontal resolution is about 300 lines. When the thus obtained multichannel signals are to be recorded and reproduced by for example a magnetic recording method, the signals may be recorded on a magnetic medium by means of a mulchannel head having $m$ channels. The maximum frequency for the signal supplied to each channel is 15 kHz which is about the same as the audio signal bandwidth and, therefore the tape speed of about 9.5 cm/sec for recording and reproduction can ensure a signal-to-noise ratio of about 40 dB. If the number of the channels is 150, the heads of a multichannel magnetic head device can be arranged in a row for a ½-inch wide tape having the track width of 60 $\mu$ m and the space of 20 $\mu$ m between the tracks, and such a multichannel magnetic head device may be readily realized by utilizing a head device produced by the recently developed evaporation deposition method. In reproduction, the signals reproduced from the respective channels (the vertically scanned signals) are successively sampled and converted into horizontally scanned signals to recover the standard television signal.

While the present invention has been outlined so far, the present invention will now be described in greater detail with reference to the illustrated exemplary circuit constructions.

Figure 4:
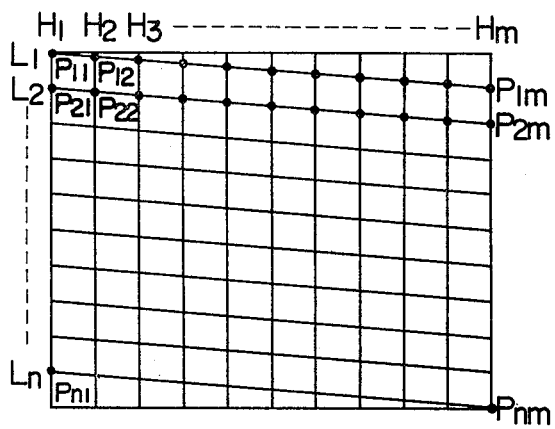
FIG. 4 is a diagram showing the manner in which a television signal is sampled and converted into vertically scanned signals through the scanning conversion method of this invention.
Figure 5:
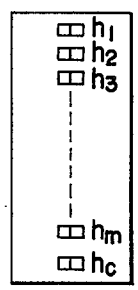
FIG. 5 is a schematic diagram showing one form of the multichannel magnetic head used with the system of this invention.

Referring first to FIG. 4, the intersections of horizontal scanning lines $L_1$, $L_2$, . . . $L_n$ and vertical scanning lines $H_1$, $H_2$, . . ., $H_m$ are respectively designated as $P_{11}$, $P_{12}$, . . . $P_{1m}$; $P_{22}$, . . ., $P_{2m}$; . . .; $P_{n1}$, . . ., $P_{nm}$. In this case, if the signals at the respective sampling points were recorded on a magnetic tape by a multichannel magnetic head device of the type shown in FIG. 5 in accordance with the above-described method, the recorded signal pattern on the magnetic tape would take the form shown in FIG. 6. In other words, the signals at the sampling points $P_{11}$, $P_{21}$, . . . $P_{n1}$ are successively recorded on the track corresponding to a head $h_1$, and the signals at the points $P_{1k}$, $P_{2k}$, . . ., $P_{nk}$ are recorded on the track corresponding to a head $h_k$. Consequently, as the tape is moved, the signals for one horizontal scanning time are recorded in the form of discrete patterns slanted with respect to the width direction of the tape. Since the sample signals are held for the duration of one horizontal scanning period and the signals are then recorded on the magnetic tape, if the recording wavelength of each sample signal is $\lambda_o$, then it is given as $$\lambda_o = \frac{v}{f_H} = \frac{v}{15.75 \text{ kHz}}$$

If the tape speed v is selected v = 9.5 cm/sec, then $$\lambda_o = \frac{9.5 \text{ cm/sec}}{15.75 \times 10^3 \text{ Hz}} \cong 6 \text{ }\mu\text{m}$$

Thus, it is necessary for each head only to record and reproduce different analog signals at the intervals of 6 $\mu$ m, and therefore it follows that the signals can be recorded and reproduced with an excellent S/N ratio of higher than 40 dB which has been realized in the recording and reproduction of the audio signal.

Figure 7A:
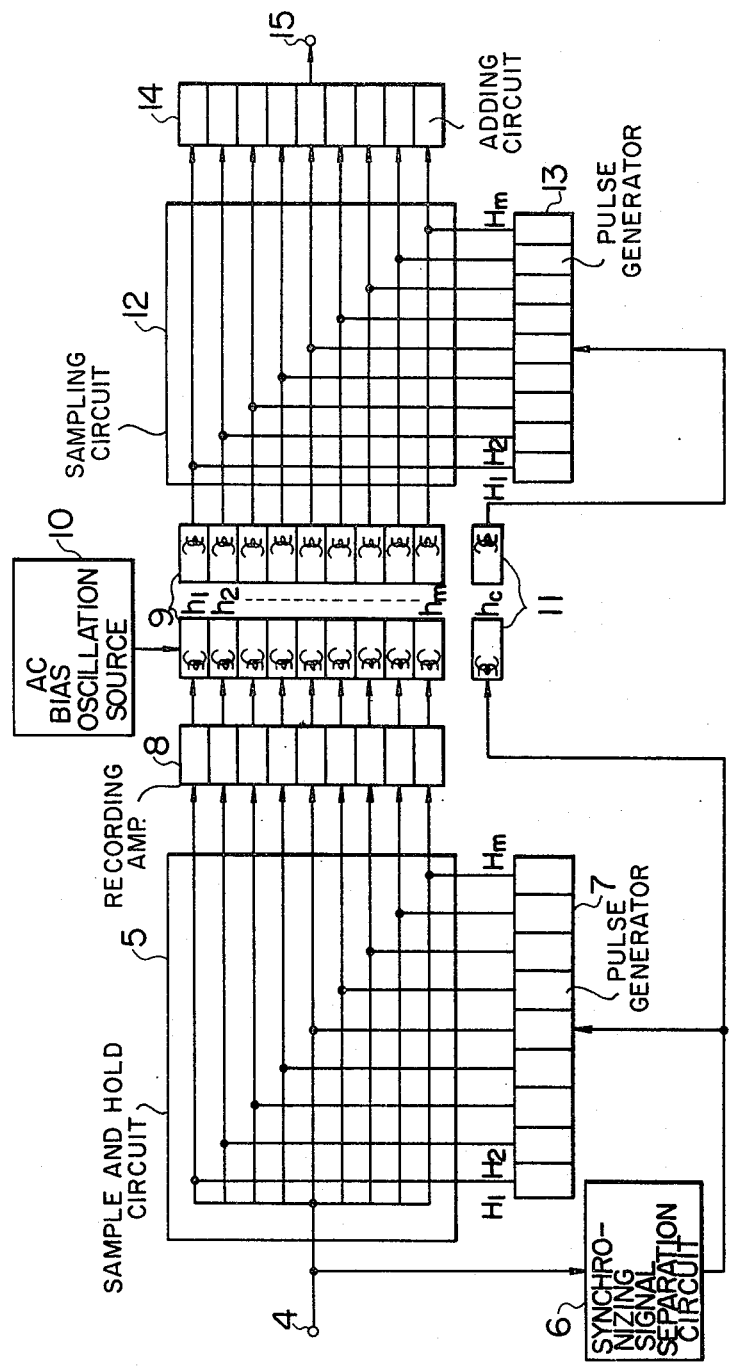
FIGS. 7a and 7b are block diagrams showing different forms of the recording and reproducing circuit used with the present invention.
Figure 8:
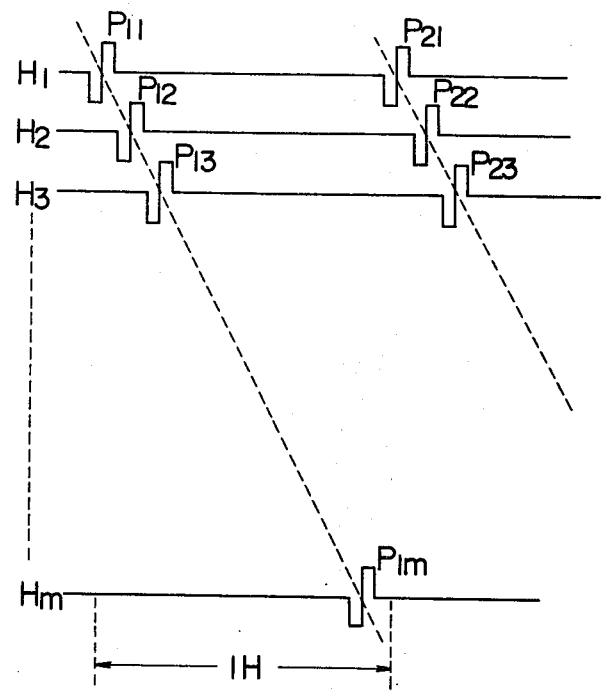
FIG. 8 is a sampling and resetting timing diagram.

FIG. 7a illustrates an exemplary form of a specific circuit construction for realizing the above-mentioned recording and reproducing method. In FIG. 7a, numeral 4 designates an input terminal for a standard television signal. This input signal is introduced to a sample-and-hold circuit 5. On the other hand, the input video signal is introduced to a synchronizing signal separation circuit 6 where the horizontal synchronizing signals are separated, and the thus separated horizontal synchronizing signals are applied to a sampling pulse and reset pulse generating circuit 7. In accordance with the sampling pulses which are produced by the circuit 7 and locked to the horizontal shychronizing signal, the input video signal is sampled in the sample-and-hold circuit 5 so that the resulting signals are held for the duration of approximately one horizontal scanning time after which the signals are applied to a recording amplifier 8 comprising m channels. The output signals of the recording amplifier 8 are supplied to an m-channel, multichannel magnetic head 9 which in turn records them on a magnetic tape. In recording, the output signal of an AC bias oscillation source 10 is supplied to the multichannel magnetic head 9 for AC biasing recording to ensure an efficient recording with reduced distortion. The timing of the sampling pulses and reset pulses from the sample-and-hold circuit 5 may be advantageously selected so that as for example shown in FIG. 8, the sampling is effected by positive going pulses $P_{11}, P_{12}, P_{13}, \ldots, P_{1m}$ and the resetting is effected by the negative going pulses just preceding the start of the next sampling pulses $P_{21}, P_{22}, P_{23}, \ldots$.

Further, the signal phase locked to the horizontal synchronizing signal may be advantageously recorded during recording by a separate magnetic head $h_c$ for use as the control signal in reproduction.

Referring again to FIG. 7a, in reproduction, by the operation contrary to the recording operation, the signals reproduced by the m-channel, multichannel magnetic head 9 are applied to a sampling circuit 12, and sampling pulses phase locked to the control signal reproduced by the control head $h_c$ and are produced by a sampling pulse generating circuit 13 so that the reproduced outputs from the magnetic head 9 are sampled with the sampling pulses and the outputs of the respective heads are added in an adding circuit 14 to recover and deliver the original video signal to an output terminal 15.

Figure 7B:
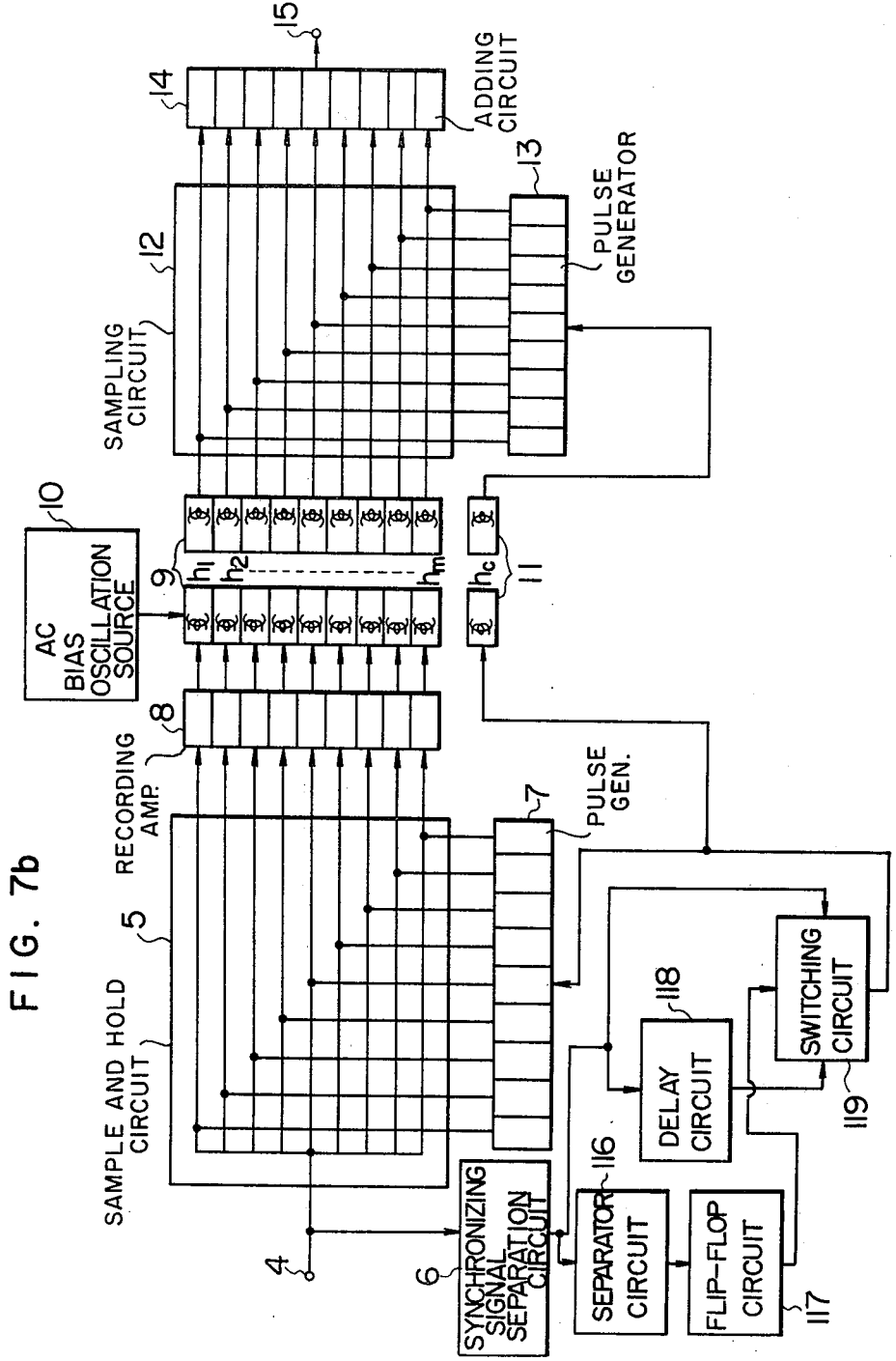

Referring to FIG. 7b, there is illustrated a modified form of the circuit shown in FIG. 7a, in which the sampling points are shifted every field by the distance approximately corresponding to ½ of the sampling period. In FIG. 7b, one output of the synchronizing signal separation circuit 6 is applied to a delay circuit 118 in which it is delayed by an amount corresponding to about ½ of the sampling period, and the output of the delay circuit 118 is applied to one input of a switching circuit 119, and the other output of the synchronizing signal separation circuit 6 is applied to the other input of the switching circuit 119. The vertical synchronizing signal is separated from the output of the synchronizing signal separation circuit 6 by a separator circuit 116 whose output is in turn applied to a flip-flop circuit 117. The switching action of the switching circuit 119 is accomplished in accordance with the output of the flip-flop circuit 117 so that the output of the synchronizing signal separation circuit 6 and the output of the delay circuit 118 are alternately delivered to the output of the switching circuit 119 at intervals of one field, and in this way the phase of the sampling pulses and the phase of the control signal are shifted every field by about ½ of the sampling period.

Figure 6:
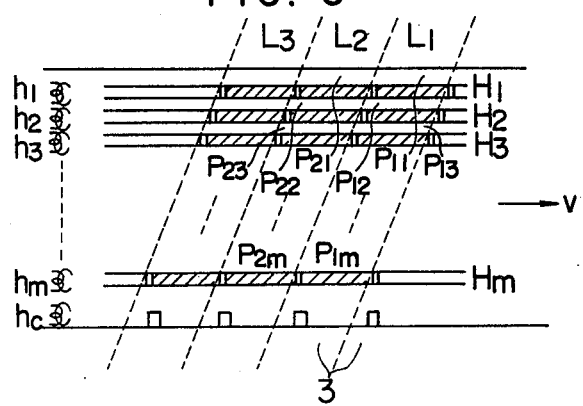
FIG. 6 is a diagram showing the recorded pattern on a magnetic tape according to the system of this invention.
Figure 9:
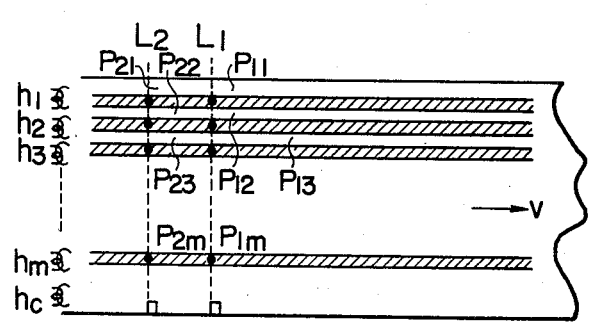
FIG. 9 is a diagram showing another form of the recorded pattern on a magnetic tape according to the invention.

While, in the embodiment described above, the recorded patterns are produced as shown in FIG. 6, another embodiment will now be described in which the recorded patterns are produced as shown in FIG. 9.

In other words, in the case of FIG. 9, the signals produced by sampling the video signal for one horizontal scanning period (e.g., signals $P_{11}, P_{12}, \ldots, P_{1m}$) are converted into parallel signals, and the signals for one horizontal scanning time are recorded vertically to the direction of the movement of the tape.

Figure 10:
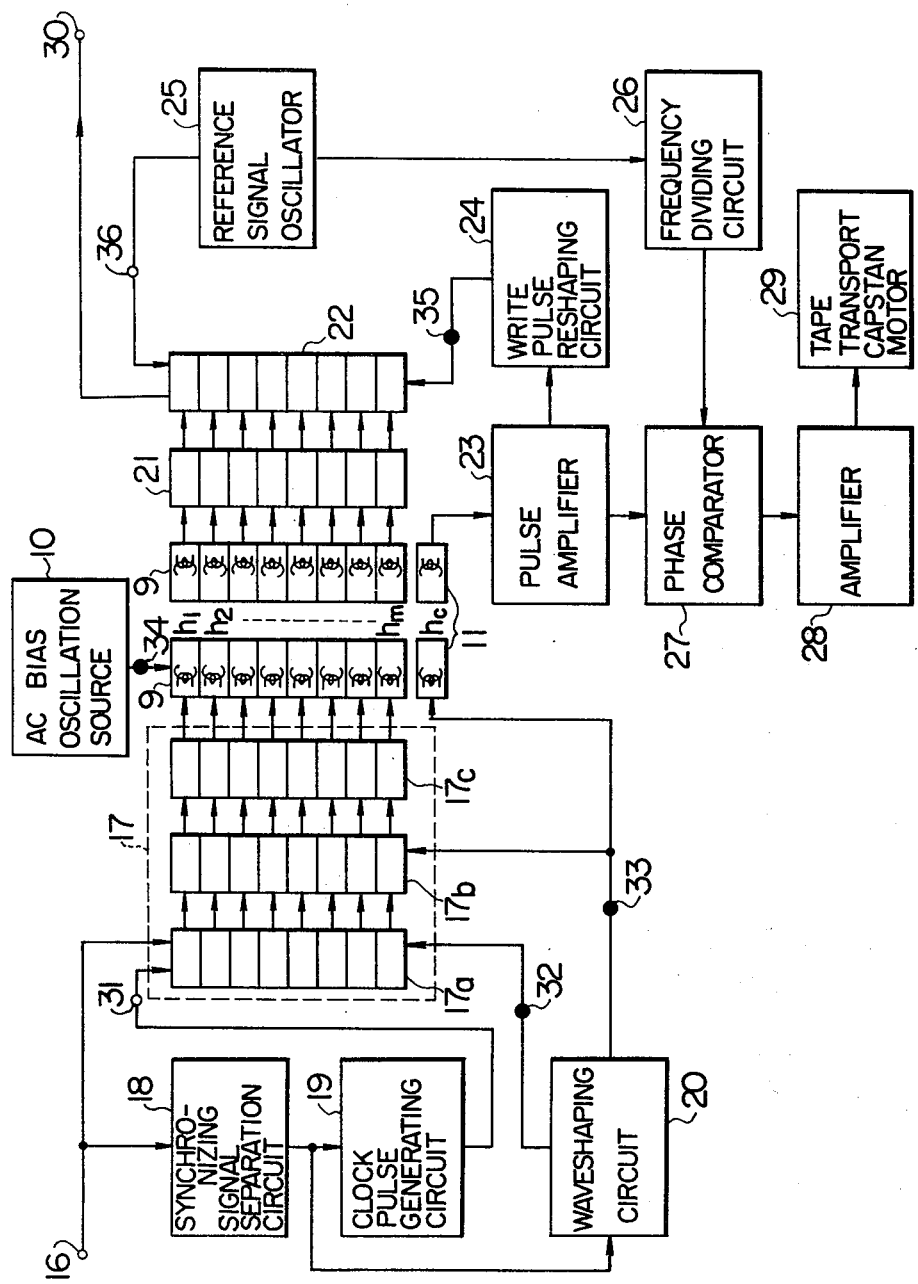
FIG. 10 is a block diagram showing an exemplary form of the circuit construction for producing the recorded pattern shown in FIG. 9.

FIG. 10 illustrates an exemplary circuit construction of a signal processing circuit for producing the recorded patterns as shown in FIG. 9. In FIG. 10, numeral 16 designates a video signal input terminal, 17 a sampling, holding and recording amplifier circuit comprising a sampling circuit 17a, a holding circuit 17b for holding sampled signals for the duration of one horizontal scanning period and a recording amplifier 17c each of which comprises the same number of channels as the m channels in the magnetic head 9. Numeral 18 designates a synchronizing signal separation circuit, 19 a clock pulse generating circuit for generating clock pulses which are phase locked to the horizontal synchronizing signals separated by the synchronizing signal separation circuit 18 and which are supplied to the sampling circuit 17a for sampling the input video signal. The sampling circuit 17a may for example be a capacitor memory circuit shown in FIG. 11.

Figure 11:
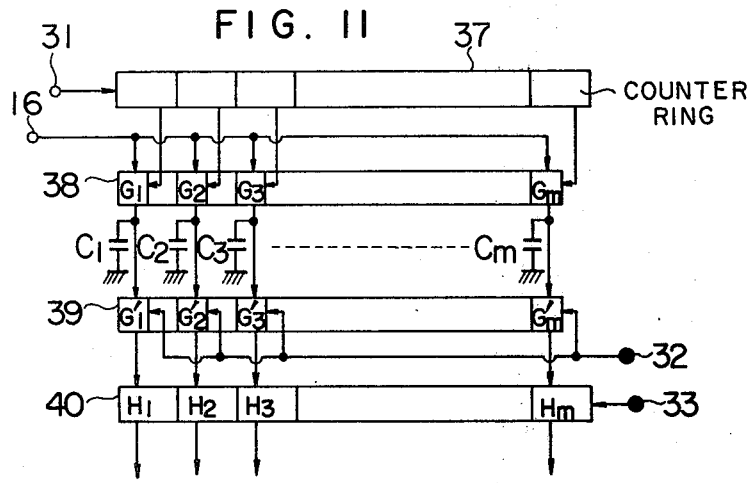
FIG. 11 is a diagram for explaining the operation of the memory circuit used with the invention.

In other words, in FIG. 11 numeral 16 designates a video signal input terminal, 31 a clock pulse input terminal, 37 a ring counter in which the application of each clock pulse causes the gating pulse to shift one place to the right to be applied to each of gates $G_1, G_2, \ldots, G_m$ in a gating circuit 38, and the input video signal is successively sampled and held in memory capacitors $C_1, C_2, \ldots, C_m$. The signals stored in the capacitors $C_1, C_2, \ldots, C_m$ are applied to a holding circuit 40 through a gating circuit 39. The respective gates $G_1', G_2', \ldots, G_m'$ in the gating circuit 39 are simultaneously opened by a read pulse applied to a terminal 32, and the signals stored in the memory capacitors are simultaneously applied to the holding circuit 40.

The signals passed through the sampling circuit and the holding circuit shown in FIG. 11, are applied to the recording amplifier 17c in FIG. 10 where the signals are subjected to amplification and equalization, and the signals are then supplied to the m-channel, multichannel magnetic head which in turn records the signals on a magnetic tape by a biasing recording with the output signal 34 from the bias signal generator 10. Numeral 20 designates a waveshaping circuit for generating read pulses 32 as well as reset pulses 33 for resetting the holding circuit 17b. The reset pulse 33 is also recorded on the magnetic tape through the control head 11 so that it may be used as the control pulse for controlling the tape speed during reproduction. In reproduction, the reproduced signals from the respective channels are amplified by a preamplifier 21 and they are then written into a memory circuit 22. The timing of the write operation is controlled in the following manner. The control signal reproduced by the control head 11 is amplified by a pulse amplifier 23 and it is then reshaped by a write pulse shaping circuit 24 whose output signal 35 is used for writing the signals from the preamplifier 21 into the memory circuit 22. The reproducing memory circuit 22 may be of the same construction as the circuit shown in FIG. 11 excluding the holding circuit 40, but used in such a manner that the direction of signal flow is opposite to that during recording so that the parallel reproduced signals are simultaneously gated by the gating circuit 39 for storage into the capacitors and the gating circuit 38 is successively opened to reproduce a continuous output signal at the output terminal 16. The reading from the memory circuit 22 is accomplished at a fixed rate by supplying at input terminal 36 signals as clock pulses from a stable reference signal oscillator 25. On the other hand, the signal frequency of the reference signal oscillator 25 is divided by a frequency dividing circuit 26, and the operation of phase comparison is performed on the output signal of the frequency dividing circuit 26 and the output signal of the pulse amplifier 23 by a phase comparator 27 whose output error signal is in turn amplified by an amplifier 28 to control a tape transport capstan motor 29 and thereby to move the tape in synchronism with the frequency of the reference signal oscillator 25. With the arrangement described so far, the video signal may be reproduced without being affected by the jitters in the recording and reproducing sections. In case a single unit of the circuit shown in FIG. 11 is used as the reproducing memory circuit, the write operation may be accomplished during the horizontal blanking period and the read operation may be carried out during any other period. The omitted horizontal synchronizing signal may be produced from the output signal of the reference signal oscillator 25 and synthesized into the reproduced television signal.

While, in the circuit described and illustrated in FIG. 10, only a single unit of the memory circuit (FIG. 11) is employed in the recording and reproducing sections, respectively, two units of this memory circuit may be employed in place of the single memory circuit so that one of the memory circuits is operated in the writing mode and the other memory circuit is operated in the read mode, and the memory circuits are alternately operated to record and reproduce the continuous video signal having no broken signal period.

Figure 12:
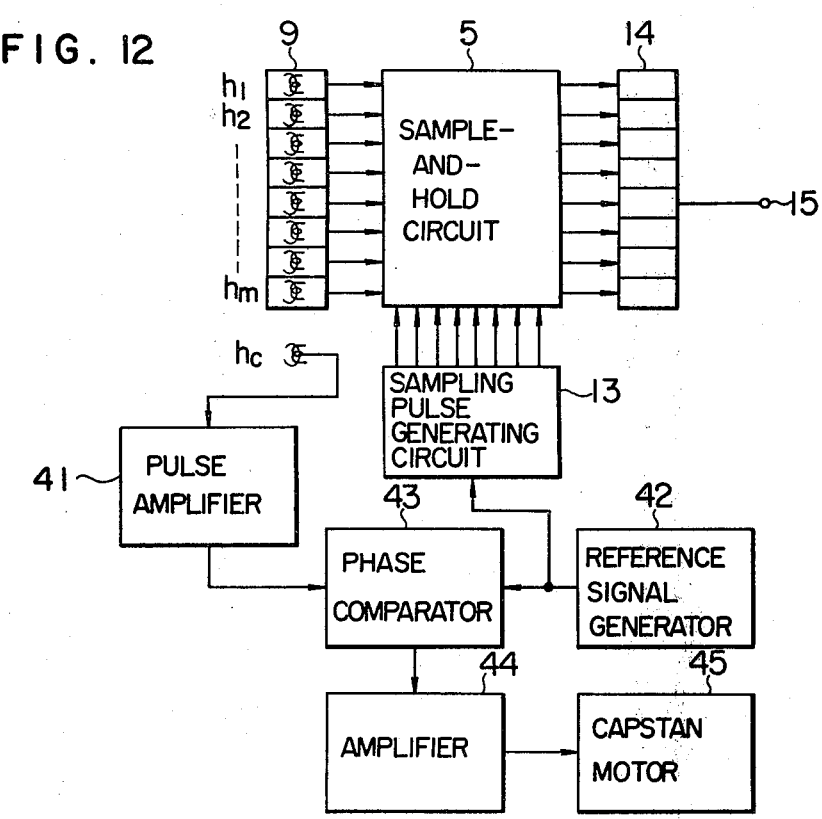
FIG. 12 is a block diagram showing a more specific circuit construction of the reproducing circuit section of the circuits shown in FIG. 7.

Further, while, in the reproducing section shown in FIG. 7a, the servo circuit for the tape transport mechanism is not shown, as in the case of FIG. 10, the arrangement of FIG. 7a may be modified as shown in FIG. 12. In other words, the reproduced signal from the control head $h_c$ is amplified by a pulse amplifier 41 and the phase of its output signal is compared with the phase of the output signal of a reference signal generator 42 to generate an error signal which is amplified by an amplifier 44 to control a capstan motor 45.

Figure 13:
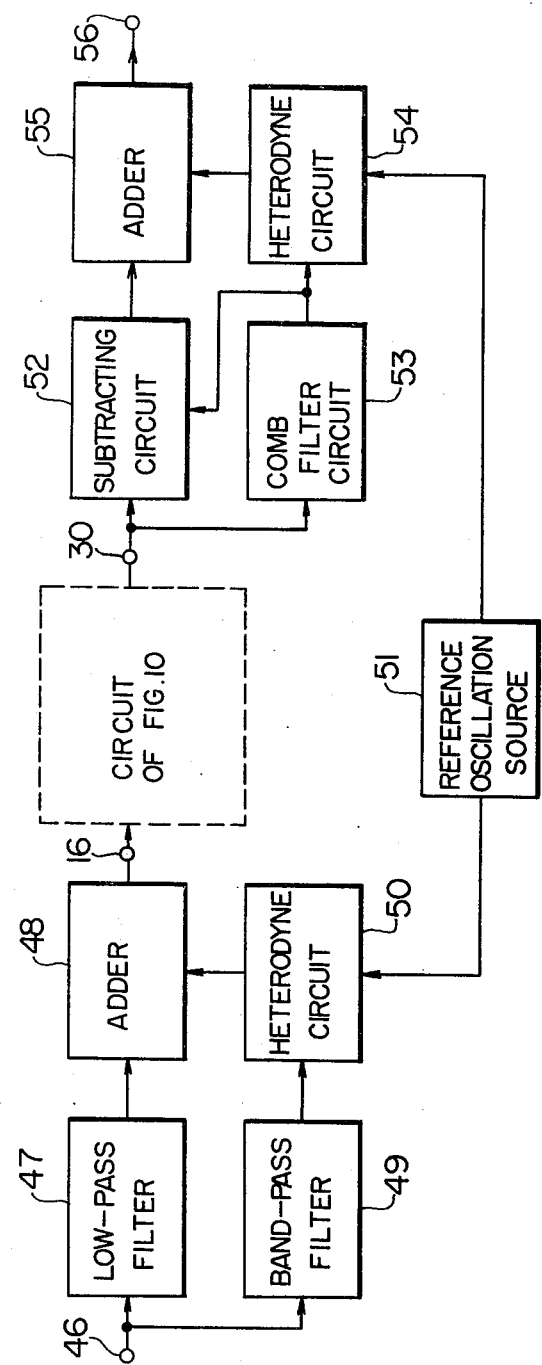
FIG. 13 is a diagram showing an exemplary form of the signal processing arrangement required for recording color television signals.

To record and reproduce a composite color signal, it is necessary that the sampling frequency for one horizontal scanning period is at least three times the color subcarrier frequency (227.5 cycles), and the recording of such a large number of sample signals by the previously described multichannel recording requires the use of a multichannel head comprising about 600 channels, thus requiring a very complicated construction. To record and reproduce the composite color with almost the same number of channels as used for the luminance signal (the frequency band of about 3 MHz is considered), the arrangement shown in FIG. 13 may be advantageously employed. In other words, the composite color signal applied to a terminal 46 is passed through a low-pass filter 47 to separate the luminance signal. On the other hand, the modulated chrominance signal is separated by a band-pass filter 49, and it is then heterodyned and converted with the signal from a stable oscillation source 51 and a heterodyne circuit 50 into the modulated chrominance signal of approximately 1 MHz which is in turn added to the luminance signal in an adder 48. In this case, it is preset so that the modulated chrominance signal converted into the lower frequency $f_s$ which is given as $$f_s = \frac{2n+1}{2} f_H ,$$

where $f_H$ is the horizontal scanning frequency and n is an integer. The output of the adder 48 may for example be connected to the circuit of FIG. 10. The modulated chrominance signal which has been converted to the lower frequency is taken out from an output 30 of the circuit of FIG. 10 through a comb filter circuit 53, and it is then heterodyned with the signal from the reference oscillation source 51 and a heterodyne circuit 54 to produce the modulated chrominance signal of the standard frequency. On the other hand, the output modulated chrominance signal from the comb filter circuit 53 and the output signal at the output 30 of the circuit shown in FIG. 10 are added in a suitable phase relationship by a subtracting circuit 52 to remove the modulated chrominance signal of about 1 MHz. The output signal or the luminance signal from the subtracting circuit 52 and the output signal or the modulated chrominance signal from the heterodyne circuit 54 are added in an adder 55 to restore the original composite color television signal at a terminal 56. With the signal processing described so far, it is possible, in terms of bandwidth, to handle the color television signal in the similar manner as the monochrome signal, and it is also possible to restore the stable original signal with the jitters eliminated in the previously mentioned manner.

Figure 14:
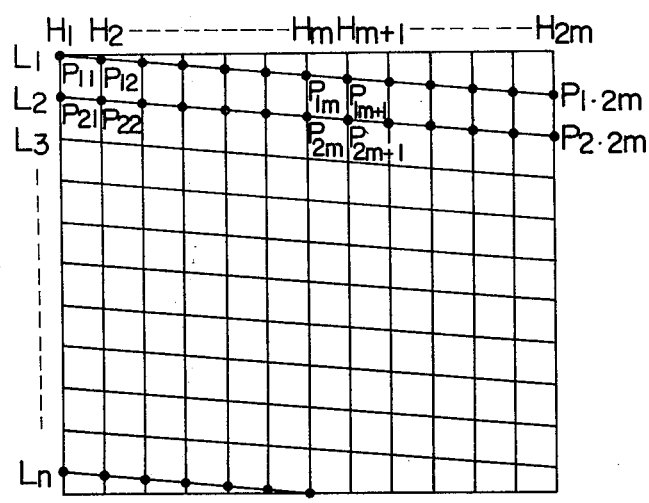
FIG. 14 is a diagram showing another form of the sampling method according to the present invention.
Figure 15:
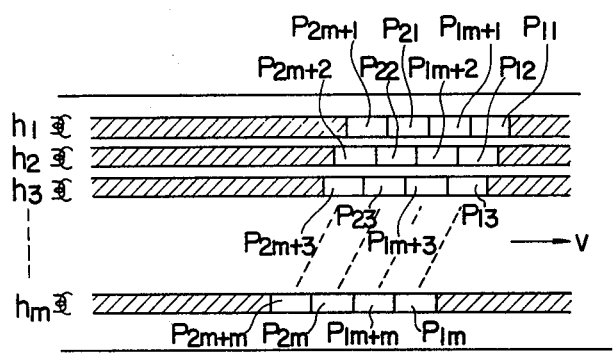
FIG. 15 is a diagram showing the recorded patterns on a magnetic tape provided by the sampling recording method shown in FIG. 14.

Further, while, in the signal conversion method shown in FIG. 2, the method of vertically interlaced scanning is utilized as a means of substantially reducing the number of recording channels, it is possible to use other methods such as shown in FIG. 14, in which each horizontal scanning period is divided into equal $n \times m$ parts ($n = 2$ in the illustrated example) and the horizontal scanning time is halved. With this arrangement, each of the heads in the multichannel magnetic head alternately records the corresponding channels included in the halves, and in this way the signals for each horizontal scanning period are recorded. By recording in this manner, the recorded patterns shown in FIG. 15 are obtained. Namely, the head $h_1$, for example, records signals $P_{11}$, $P_{1m+1}$, $P_{21}$, $P_{2m+1}$, . . . and, while the recording wavelength is one half of that in the previously described method, i.e., on the order of 3 $\mu m$, it nevertheless falls within the region that permits a satisfactory recording and reproduction at low tape speed.

With this method, the number of channels in the magnetic head may be reduced by half, and the number may even be reduced to one fourth by using this method in combination with the method of FIG. 2.

What is claimed is:

1. A television signal recording and reproducing system comprising:
   means for generating a clock pulse having a frequency which is an $n \times m$ multiple of a horizontal scanning frequency and is phase-locked to the horizontal scanning frequency;
   sampling means for sequentially sampling a television signal to be recorded at $n \times m$ points during each horizontal scanning period thereof in response to the clock pulse and for converting said sampled signals into parallel signals;
   means for holding said sampled signals for a period of time approximately corresponding to $1/n$ of said horizontal scanning period;
   means for recording said held signals on a recording medium on $m$ channels of recording tracks and for reproducing said recorded signals;
   means for writing said reproduced signals on an $m$-channel memory circuit at the same time at the interval of $1/n$ of the horizontal scanning period;
   means for reading out said written signals one by one at the interval of $1/m \times n$ of the horizontal scanning period; and
   means for synthesizing a continuous television signal from the read out signals.

2. A television signal recording and reproducing system according to claim 1, wherein said sampling means comprises:
   an $m$-bit ring counter driven by said clock pulse;
   means for sampling the input television signal in response to each of $m$-bit output pulses from said ring counter;
   $m$-channel memory elements for storing sampled signals; and
   means for simultaneously gating said stored signals in said $m$-channel memory elements to apply the gated signals to said holding means.

3. A television signal recording and reproducing system according to claim 1, wherein $n = 1$.

4. A television signal recording and reproducing system according to claim 1, wherein said means for writing said reproduced signals on said $m$-channel memory circuit includes a first clock signal in synchronism with a reproduced control signal, and said means for reading out said written signals includes a second clock signal generated in a reference signal oscillator.

5. A television signal recording and reproducing system comprising:
   means for sequentially sampling a television signal to be recorded at $n \times m$ points during each horizontal scanning period thereof;
   means for shifting said $n \times m$ sampling points in the adjacent fields of said television signal from each other by the distance corresponding to ½ of one sampling period;
   $m$ groups of holding means for holding said sampled signals for the duration of a time aproximately corresponding to $1/n$ of the horizontal scanning period;
   means for causing said $m$ groups of holding means to sequentially hold said sampled signals;
   means for recording on a magnetic medium in a form of $m$ rows of recorded patterns said sampled signals held by said $m$ groups of holding means and for reproducing said recorded signals; and
   means for synthesizing a continuous television signal from said reproduced $m$ channel signals.

6. A television signal recording and reproducing system according to claim 5, wherein $n = 1$.

* * * * *